(12) United States Patent
Xu (10) Patent No.: US 7,267,534 B2
(45) Date of Patent: *Sep. 11, 2007

(54) METHODS FOR MANUFACTURING FOAM MATERIAL INCLUDING SYSTEMS WITH PRESSURE RESTRICTION ELEMENT

(75) Inventor: Jingyi Xu, Burlington, MA (US)

(73) Assignee: Trexel, Inc., Woburn, MA (US)

( * ) Notice: Subject to any disclaimer, the term of this patent is extended or adjusted under 35 U.S.C. 154(b) by 296 days.

This patent is subject to a terminal disclaimer.

(21) Appl. No.: 10/462,387

(22) Filed: Jun. 16, 2003

(65) Prior Publication Data

US 2005/0009936 A1    Jan. 13, 2005

Related U.S. Application Data (60) Continuation of application No. 09/942,147, filed on Aug. 29, 2001, now Pat. No. 6,579,910, which is a division of application No. 09/285,948, filed on Apr. 2, 1999, now Pat. No. 6,322,347.

(51) Int. Cl.
    *B29C 44/36*      (2006.01)
    *B29C 44/38*      (2006.01)
    *B29C 44/60*      (2006.01)

(52) U.S. Cl. .................. 425/4 R; 425/4 C; 425/208; 425/532; 425/562

(58) Field of Classification Search ............. 425/532, 425/557, 4 C, 817 C, 4 R, 817 R, 208, 562
See application file for complete search history.

(56) References Cited

U.S. PATENT DOCUMENTS 3,436,446 A    4/1969    Angell (Continued)

FOREIGN PATENT DOCUMENTS

DE      32 03 724 A1      2/1982

(Continued)

OTHER PUBLICATIONS

Communication of a Notice of Opposition, from EP 1 165 301, dated Nov. 18, 2004.

(Continued)

*Primary Examiner*—Allan R. Kuhns
(74) *Attorney, Agent, or Firm*—Wolf, Greenfield & Sacks, P.C.

(57) ABSTRACT

The invention provides systems, methods, and articles useful in the production of foams, and, in particular microcellular foams. The systems include a restriction element that reduces the backflow of polymer melt in an extruder while polymeric material is injected into a mold or ejected from a die. The restriction element is positioned upstream of a blowing agent injection port to maintain the solution of polymer and blowing agent in the extruder above a minimum pressure throughout an injection or ejection cycle, and preferably above the critical pressure required for the maintenance of a single-phase solution of polymer and blowing agent. The systems can be used in injection molding, blow molding, or in any other processing techniques that include injection or ejection cycles. In some embodiments, the systems utilize reciprocating screws for injection or ejection. In other embodiments, the systems include an accumulator connected to an outlet of the extruder, in which a plunger moves to inject polymeric material into a mold or eject polymeric material from a die.

32 Claims, 7 Drawing Sheets

U.S. PATENT DOCUMENTS

| | | | |
|---|---|---|---|
| 3,687,582 A | | 8/1972 | Hendry et al. |
| 4,096,218 A | | 6/1978 | Yasuike et al. |
| 4,124,308 A | | 11/1978 | Sokolow |
| 4,124,336 A | | 11/1978 | Johnson |
| 4,229,395 A | | 10/1980 | Nagumo et al. |
| 4,381,272 A | | 4/1983 | Ehritt |
| 4,473,665 A | | 9/1984 | Martini-Vvedensky et al. |
| 4,512,733 A | | 4/1985 | Eichlseder et al. |
| 4,761,256 A | | 8/1988 | Hardenbrook et al. |
| 4,783,292 A | | 11/1988 | Rogers |
| 4,783,295 A | | 11/1988 | Kearns et al. |
| 4,898,760 A | * | 2/1990 | Halberstadt et al. ........ 428/122 |
| 5,124,095 A | | 6/1992 | Gianni et al. |
| 5,158,986 A | | 10/1992 | Cha et al. |
| 5,160,674 A | | 11/1992 | Colton et al. |
| 5,164,207 A | | 11/1992 | Durina |
| 5,258,158 A | | 11/1993 | Dray |
| 5,334,356 A | | 8/1994 | Baldwin et al. |
| 5,866,053 A | | 2/1999 | Park et al. |
| 6,322,347 B1 | * | 11/2001 | Xu ........................ 425/376.1 |

FOREIGN PATENT DOCUMENTS

| | | |
|---|---|---|
| DE | 297 01 495 U1 | 1/1997 |
| EP | 0 707 935 A2 | 4/1996 |
| EP | 0 818 292 A2 | 7/1997 |
| EP | 0 799 853 A1 | 10/1997 |
| EP | 1 165 301 B1 | 2/2004 |
| JP | 11-034129 | 2/1999 |
| JP | 11-034130 | 2/1999 |
| WO | WO89/00918 | 2/1989 |
| WO | WO95/24440 | 9/1995 |
| WO | WO96/13368 | 5/1996 |
| WO | WO98/08667 | 3/1998 |
| WO | WO98/31521 | 7/1998 |

OTHER PUBLICATIONS

Patent Abstract of Japan, Publication No. 58197029, *Manufacturing of Synthetic Resin Molding*, Ube Ind. Ltd., 16.11.83.

Baldwin, Daniel F. "*A Processing System for The Extrusion of Microcellular Polymer Sheets: Shaping and Cell Growth Control*", Cellular and Microcellular Materials, 53:85-107, 1994.

Park et al., "*Filamentary Extrusion of Microcellular Polymers Using a Rapid Decompressive Element*", Polymer Engineering and Science, 36:34-48, 1996.

Park et al., "*Effect of the Pressure Drop Rate on Cell Nucleation in Continuous Processing of Microcellular Polymers*", Polymer Engineering and Science, 35:432-440, 1995.

* cited by examiner

METHODS FOR MANUFACTURING FOAM MATERIAL INCLUDING SYSTEMS WITH PRESSURE RESTRICTION ELEMENT

RELATED APPLICATIONS

This application is a continuation of U.S. patent application Ser. No. 09/942,147, filed on Aug. 29, 2001 now U.S. Pat. No. 6,579,910, and entitled, "METHOD FOR MANUFACTURING FOAM MATERIAL INCLUDING SYSTEMS WITH PRESSURE RESTRICTION ELEMENT," which is herein incorporated by reference in its entirety, and which is a divisional of U.S. patent application Ser. No. 09/285,948, filed on Apr. 2, 1999, and entitled, "METHOD FOR MANUFACTURING FOAM MATERIAL INCLUDING SYSTEMS WITH PRESSURE RESTRICTION ELEMENT," now issued as U.S. Pat. No. 6,322,347 on Nov. 27, 2001, which is herein incorporated by reference in its entirety.

FIELD OF THE INVENTION

The present invention relates generally to polymeric foam processing, and more particularly to systems, methods, and articles for manufacturing polymer foams, including microcellular foams.

BACKGROUND OF THE INVENTION

Microcellular foam is typically defined as having cell sizes of less than 100 microns and a cell density of greater than $10^6$ cells/cm$^3$ of the original solid material. Generally, the requirements for forming microcellular foams include creating a single-phase solution of polymeric material and physical blowing agent, and subjecting the solution to a thermodynamic instability to create sites of nucleation of very high density which grow into cells.

Methods for molding microcellular material have been described. U.S. Pat. No. 4,473,665 (Martini-Vvedensky) describes a molding system and method for producing microcellular parts. Polymeric pellets are pre-pressurized with a gaseous blowing agent and melted in a conventional extruder to form a solution of blowing agent and molten polymer, which then is extruded into a pressurized mold cavity. The pressure in the mold is maintained above the solubility pressure of the gaseous blowing agent at melt temperatures for the given initial saturation. When the molded part temperature drops to the appropriate critical nucleation temperature, the pressure on the mold is dropped, typically to ambient, and the part is allowed to foam.

U.S. Pat. No. 5,158,986 (Cha et al.) describes an alternative molding system and method for producing microcellular parts. Polymeric pellets are introduced into a conventional extruder and melted. A blowing agent of carbon dioxide in its supercritical state is established in the extrusion barrel and mixed to form a homogenous solution of blowing agent and polymeric material. A portion of the extrusion barrel is heated so that as the mixture flows through the barrel, a thermodynamic instability is created, thereby creating sites of nucleation in the molten polymeric material. The nucleated material is extruded into a pressurized mold cavity. Pressure within the mold is maintained by counter pressure of air. Cell growth occurs inside the mold cavity when the mold cavity is expanded and the pressure therein is reduced rapidly; expansion of the mold provides a molded and foamed article having small cell sizes and high cell densities. Nucleation and cell growth occur separately according to the technique; thermally-induced nucleation takes place in the barrel of the extruder, and cell growth takes place in the mold.

The use of check valves, including ring check valves, is known in injection molding to prevent the molten plastic accumulated at the distal end of a reciprocating screw from flowing backwards during an injection of the plastic into a mold.

The following U.S. Patent Applications describe typical check valve configurations used in plastic processing systems. U.S. Pat. No. 4,512,733 (Eichlseder et al.) describes a check valve on the end of a plastifying screw for an injection molding apparatus. The check valve comprises a valve housing and an axial displacable valve member that is received in this housing.

U.S. Pat. No. 5,164,207 (Durina) describes a plastic extruder having a rotating screw within a cylindrical shell which is used to feed molten plastic to a high pressure injection molding apparatus. An automatic shut off valve is mounted at the forward end of the screw. During the extrusion step, the valve is forced open to allow molten plastic to flow from the extruder to the injection molder. The valve automatically closes under the action of a spring during the high pressure injection molding operation to prevent backflow of plastic through the extruder.

U.S. Pat. No. 5,258,158 (Dray) describes a positive type non-return valve that is used to positively stop the reverse flow of material in injection molding machines. The valve can be connected at a downstream end of the screw with a thread, or can also be an integral part of the screw. The valve allows material to pass when the screw is rotating, but closes when the screw translates forward, as in an injection molding cycle, with no screw rotation.

While the above and other reports represent several techniques and systems associated with the manufacture of foam material and microcellular material, a need exists in the art for improved systems for foam processing, and in particular for microcellular foam processing.

It is, therefore, an object of the invention to provide systems, methods, and articles useful in the production of microcellular foams, and also useful in the production of conventional foams.

SUMMARY OF THE INVENTION

The present invention is directed to systems, methods, and articles useful in the production of foams, and in particular, microcellular foams. The systems include a restriction element that reduces the backflow of polymer melt in an extruder while injecting polymeric material into a mold or ejecting polymeric material through a die. The restriction element is positioned upstream of a blowing agent injection port to maintain the solution of polymer and blowing agent in the extruder above a minimum pressure, and, preferably, above the pressure required for the maintenance of a single-phase solution of polymer and blowing agent. The systems can be used in injection molding, blow molding, or in any other processing techniques that accumulate and inject polymeric material into a mold or eject polymeric material from a die. In some embodiments, the systems utilize reciprocating screws for injection or ejection or, in other embodiments, the systems include an accumulator connected to an outlet of the extruder, in which a plunger moves to inject or eject polymeric material.

In one aspect of the invention, a system is provided for processing polymeric material operable to cyclically inject polymeric material into a mold or eject polymeric material from a die. The system includes a barrel having an upstream direction and a downstream direction and a polymer processing screw constructed and arranged to rotate within the barrel to convey polymeric material in a downstream direction within a polymer processing space defined by the barrel and the screw. The system also includes a blowing agent port connecting to the polymer processing space and positioned to introduce a blowing agent into polymeric material in the polymer processing space to allow formation therein of a solution of polymer and blowing agent. The system also includes a restriction element positioned within the polymer processing space upstream of the blowing agent port that restricts the upstream flow of polymeric material therethrough during at least a portion of an injection or an ejection cycle.

In another aspect of the invention, a system is provided for processing polymeric material. The system includes an extruder including a screw constructed and arranged to rotate within a barrel to convey polymeric material in a downstream direction within a polymer processing space. The extruder has a first inlet for receiving a precursor of foamed polymeric material, an outlet to deliver a solution of polymeric material and blowing agent from the extruder, and a blowing agent inlet positioned downstream of the first inlet and upstream of the outlet to introduce a blowing agent into the polymeric material in the polymer processing space to allow formation therein a solution of polymer and blowing agent. The extruder is constructed and arranged to maintain the solution of polymer and blowing agent in the polymer processing space between the blowing agent inlet and the extruder outlet at a pressure of at least 1000 psi throughout an injection or an ejection cycle.

In another aspect of the invention, a polymer processing screw is provided. The polymer processing screw is constructed and arranged to rotate within a barrel of a polymer processing system to convey polymeric material in a downstream direction within a polymer processing space defined by the barrel and the screw, and to reciprocate within the barrel between an accumulation position and an injection position. The polymer processing screw includes a blowing agent receiving section, and a restriction element constructed and arranged upstream of the blowing agent receiving section to restrict upstream flow of polymeric material therethrough during at least a portion of an injection or an ejection cycle.

In another aspect of the invention, a method of processing polymeric material is provided. The method includes the steps of conveying polymeric material in a downstream direction within a polymer processing space between a polymer processing screw and a barrel, introducing a blowing agent into the polymeric material in the polymer processing space through a blowing agent port and forming therein a solution of polymer and blowing agent, and restricting the upstream flow of polymeric material through at a location upstream of the blowing port during at least a portion of an injection or an ejection cycle.

In another aspect of the invention, a method of processing polymeric material is provided. The method includes the steps of conveying polymeric material in a downstream direction within a polymer processing space defined between a screw and a barrel of an extruder, and introducing a blowing agent into the polymeric material within the barrel through a blowing agent inlet to form a solution of polymer and blowing agent therein. The method further includes maintaining the solution of polymer and blowing agent at a pressure of at least 1000 psi within the polymer processing space between the blowing agent inlet and an outlet of the extruder throughout an injection or an ejection cycle.

In preferred embodiments in each of the above aspects, the restriction element is constructed and arranged to restrict the upstream flow of polymeric material therethrough to maintain the polymeric material downstream of the restriction element at a pressure greater than the critical pressure required for a single-phase solution of polymeric material and blowing agent. In certain preferred embodiments, the restriction element is a ring-check valve. In some preferred cases, the ring-check valve is spring-loaded.

Among other advantages, the restriction element restricts backflow (upstream flow) of polymeric material and maintains the downstream pressure of the polymer and blowing agent solution throughout an injection or an ejection cycle. This enables the single-phase solution of polymer and blowing agent formed during microcellular processes to be continuously maintained in the extruder. Because microcellular processing requires the maintenance of the single-phase solution, the restriction element is particularly useful in forming microcellular foam.

The restriction element is intended to be used to maintain pressure in systems that include reciprocating screws for injection or ejection, and also in systems that have an external accumulator that utilize a plunger for injection or ejection. In typical processing systems that do not include the restriction element and involve the injection or ejection of polymeric material, it is difficult, if not impossible, to maintain pressure throughout an injection or ejection cycle. For example, in systems using reciprocating screws for injection, polymeric material will typically flow backwards when the screw reciprocates in a downstream direction to inject material which results in a pressure drop in the polymeric material in the extruder oftentimes below that required for the maintenance of the single-phase solution. In other systems that use an accumulator external of an extruder, the pressure typically drops when the screw idles during injection.

The restriction element is advantageously located upstream of the blowing agent injection port so that the entire solution of polymer and blowing agent is maintained at high pressures. This location distinguishes from other valves located at a distal end the screw that only prevent the backflow and pressure drop in accumulated polymeric material downstream of the screw and, thus, would not be effective in maintaining the entire solution of polymer and blowing agent at high pressures.

In certain embodiments of the invention, the restriction element permits limited upstream flow of polymeric material therethrough. This limited upstream flow can prevent unsafe, high-pressures from arising during injection, but is not significant enough to reduce the pressure downstream of the restriction to that below that required for the maintenance of the single-phase solution.

Unless otherwise defined, all technical and scientific terms used herein have the same meaning as commonly understood by one of ordinary skill in the art to which the invention belongs. Although methods and systems similar or equivalent to those described herein can be used in the practice or testing of the present invention, suitable methods and systems are described below. All publications, patent applications patents, and other references mentioned herein are incorporated by reference in their entirety. In case of conflict, the present specification, including definitions, will control. In addition, the systems, methods, and examples are illustrative only and not intended to be limiting.

Other advantages, novel features, and objects of the invention will bercome apparent from the following detailed description of the invention, and from the claims.

DETAILED DESCRIPTION OF THE INVENTION

Commonly-owned, co-pending International patent application serial no. PCT/US97/15088, filed Aug. 26, 1997 and published Mar. 5, 1998 as WO98/08867 and commonly-owned co-pending international patent application serial no. PCT/US97/27118, filed Dec. 18, 1998, and commonly-owned co-pending U.S. application Ser. No. 09/241,352 filed Feb. 2, 1999 are incorporated herein by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like. A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc. "Polymeric material" refers to material that is substantially, if not entirely, polymeric in nature. "Polymeric material" may optionally also include other additives known in the art, such as filler, nucleating agents, and can include a blowing agent dissolved in the polymer. "Essentially closed-cell" microcellular material is meant to define material that, at a thickness of about 100 microns, contains no connected cell pathway through the material. "Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention.

For purposes of the present invention, microcellular material is defined as foamed material having an average cell size of less than about 100 microns in diameter, or material of cell density of generally greater than at least about $10^6$ cells per cubic centimeter, or preferably both. Within the scope of this definition, microcellular material may include a small percentage (less than 1% of the total number of cells) of cells having a cell size of greater than about 100 microns in diameter. The void fraction of microcellular material generally varies from 5% to 98%.

In preferred embodiments, microcellular material produced according to the systems and methods of the invention have an average cell size of less than about 50 microns. In some embodiments particularly small cell size is desired, and in these embodiments material of the invention has average cell size of less than about 20 microns, more preferably less than about 10 microns, and more preferably still less than about 5 microns. The microcellular material preferably has a maximum cell size of about 100 microns. In embodiments where particularly small cell size is desired, the material can have maximum cell size of about 50 microns, more preferably about 25 microns, more preferably about 15 microns, more preferably about 8 microns, and more preferably still about 5 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose.

In one embodiment, essentially closed-cell microcellular material is produced in accordance with the techniques of the present invention. As used herein, "essentially closed-cell" is meant to define material that, at a thickness of about 100 microns, contains no connected cell pathway through the material.

In other embodiments, the material produced using the systems and methods of the invention are conventional foams have average cell sizes of greater than 100 microns. In some embodiments, the foams may be primarily microcellular but may also have regions including a small percentage of large cells. That is, in these embodiments the majority of the cells have a cell size of less than 100 microns and a minority of cells having a size of greater than 100 microns.

The present invention provides systems, methods, and articles for the processing of polymeric material, including microcellular polymeric material, and in particular systems, methods, and articles for the processing of polymeric material by cyclically injecting polymeric material into a mold or cyclically ejecting polymeric material through a die. Those of ordinary skill in the art understand the structural definition of a system that is constructed and arranged for cyclically injecting polymeric material into a mold or cyclically ejecting polymeric material from a die. The present invention encompasses all structures, not limited to those structures described herein. For example, although injection molding is primarily described, the invention can be modified readily by those of ordinary skill in the art for use in other techniques that utilize injection cycles or ejection cycles, such as blow-molding.

Referring to FIGS. 1-4, according to one embodiment of the invention, an injection molding system 20 includes an extruder 30 fluidly connected to an injection mold 37. A polymer processing screw 38 rotates within a barrel 32 of the extruder to convey polymeric material in a downstream direction 33 in a polymer processing space 34 defined between the screw and the barrel. The system includes a blowing agent port 54 fluidly connecting a blowing agent source 56 to the polymer processing space 34 for injection of blowing agent into the polymeric material within the processing space to form a polymer and blowing agent solution therein. At the beginning of an injection cycle, polymer processing screw 38 is located in an accumulation position (FIG. 1) and a charge of polymer and blowing agent is accumulated in an accumulation region 50 within the barrel downstream from the screw 38. Once a sufficient charge of the solution has been accumulated, the screw moves in a downstream direction to an injection position (FIG. 3) to inject the solution into the mold 37. After injection, the screw returns to the accumulation position to complete the cycle. As described further below, the system includes a restriction element 35 arranged upstream of the blowing agent port 54 to maintain the polymer and blowing agent solution downstream of the restriction element at sufficient pressure throughout the injection cycle. The restriction element remains upstream of the blowing agent port at all times during reciprocating of the screw.

Figure 1:
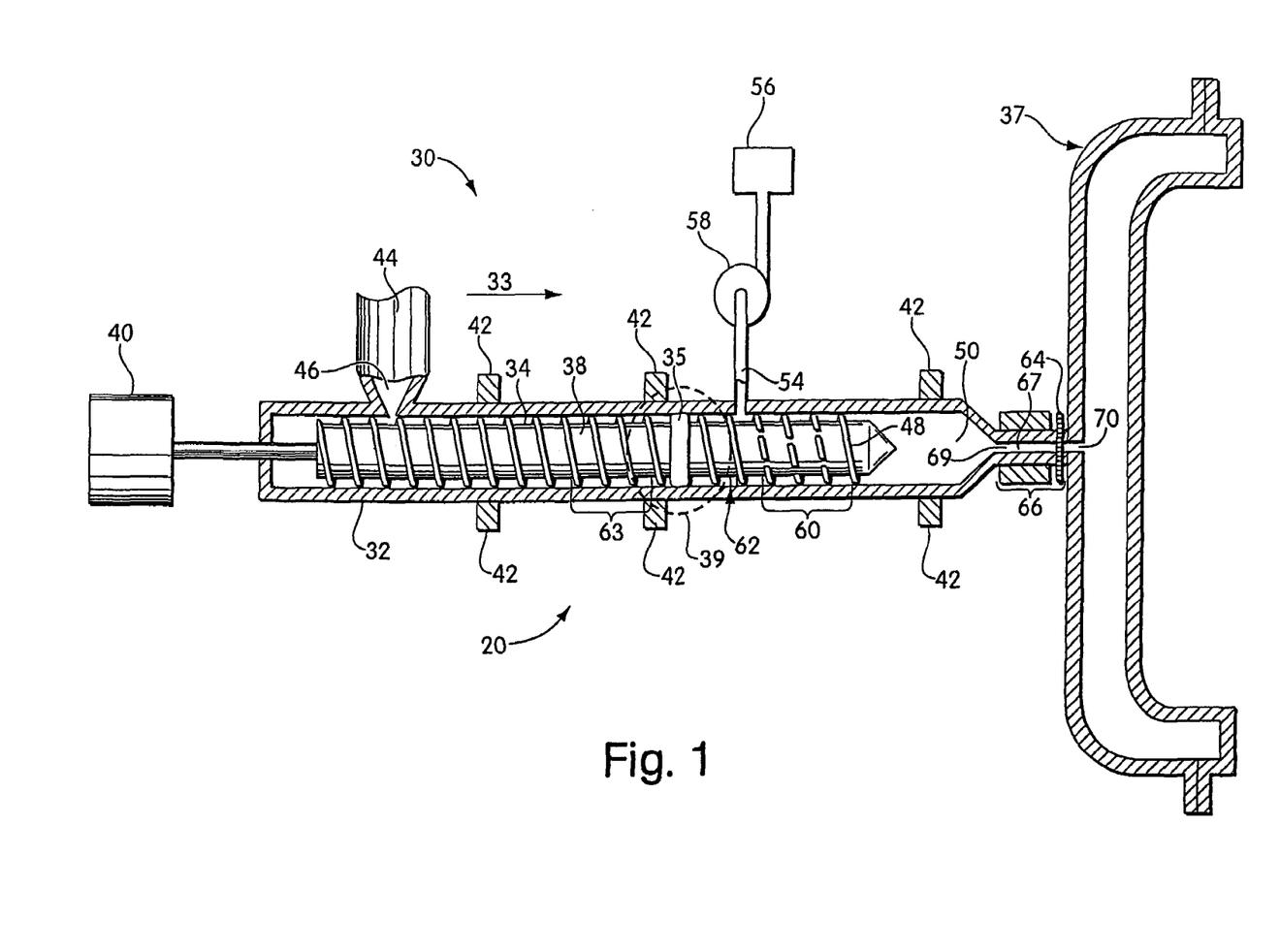
FIG. 1 illustrates an injection molding system including a reciprocating screw in an accumulation position.
Figure 1A:
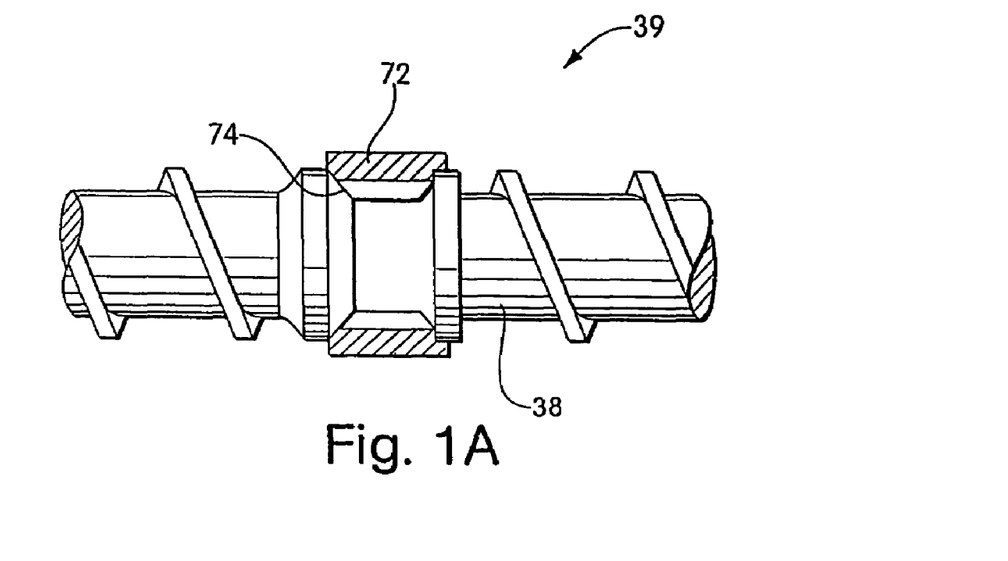
FIG. 1A is an exploded view of section 39 in the injection molding system of FIG. 1.

Positioned along barrel 32, optionally, are temperature control units 42. Control units 42 can be electrical heaters, can include passageways for temperature control fluid, and or the like. Units 42 can be used to heat a stream of pelletized or fluid polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided.

Barrel 32 is constructed and arranged to receive a precursor of polymeric material. As used herein, "precursor of polymeric material" is meant to include all materials that are fluid, or can form a fluid and that subsequently can harden to form a microcellular polymeric article or a conventional polymeric foam article. Typically, the precursor is defined by thermoplastic polymer pellets, but can include other species. For example, in one embodiment the precursor can be defined by species that will react to form microcellular polymeric material as described, under a variety of conditions. The invention is meant to embrace production of microcellular material from any combination of species that together can react to form a polymer, typically monomers or low-molecular-weight polymeric precursors which are mixed and foamed as the reaction takes place. In general, species embraced by the invention include thermosetting polymers in which a significant increase in molecular weight of the polymer occurs during reaction, and during foaming, due to crosslinking of polymeric components. For example, polyamides of the condensation and addition type, including aliphatic and aromatic polyamides such as polyhexamethyleneadipamide, poly(e-caprolactam), polyenes such as cycloaromatic polymers including polydicyclopentadiene, acrylic polymers such as polyacrylamide, polyacrylamate, acrylic ester polymers such as 2-cyanoacrylic ester polymers, acrylonitrile polymers, and combinations.

Preferably, a thermoplastic polymer or combination of thermoplastic polymers is selected from among amorphous, semicrystalline, and crystalline material including polyaromatics such as styrenic polymers including polystyrene, polyolefins such as polyethylene and polypropylene, fluoropolymers, crosslinkable polyolefins, polyamides, and polyvinyl chloride. Thermoplastic elastomers can be used as well, especially metallocene-catalyzed polyethylene.

Typically, introduction of the pre-polymeric precursor utilizes a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system.

In this embodiment, along barrel 32 of system 30 is at least one port 54 in fluid communication with source 56 of a physical blowing agent. Any of a wide variety of physical blowing agents known to those of ordinary skill in the art such as hydrocarbons, chlorofluorocarbons, nitrogen, carbon dioxide, and the like can be used in connection with the invention, or mixtures thereof, and, according to a preferred embodiment, source 56 provides carbon dioxide as a blowing agent. Supercritical fluid blowing agents are especially preferred, in particular supercritical carbon dioxide. In one embodiment solely supercritical carbon dioxide is used as blowing agent. Supercritical carbon dioxide can be introduced into the extruder and made to form rapidly a single-phase solution with the polymeric material either by injecting carbon dioxide as a supercritical fluid, or injecting carbon dioxide as a gas or liquid and allowing conditions within the extruder to render the carbon dioxide supercritical. Injection of carbon dioxide into the extruder in a supercritical state is preferred. The single-phase solution of supercritical carbon dioxide and polymeric material formed in this manner has a very low viscosity which advantageously allows lower temperature molding, as well as rapid filling of molds having close tolerances to form very thin molded parts, which is discussed in greater detail below.

One advantage of using a physical blowing agent, rather than a chemical blowing agent, is that recyclability of product is maximized. Use of a chemical blowing agent typically reduces the attractiveness of a polymer to recycling since residual chemical blowing agent and blowing agent by-products contribute to an overall non-uniform recyclable material pool. Since foams blown with chemical blowing agents inherently include a residual, unreacted chemical blowing agent after a final foam product has been produced, as well as chemical by-products of the reaction that forms a blowing agent, material of the present invention in this set of embodiments includes residual chemical blowing agent, or reaction by-product of chemical blowing agent, in an amount less than that inherently found in articles blown with 0.1% by weight chemical blowing agent or more, preferably in an amount less than that inherently found in articles blown with 0.05% by weight chemical blowing agent or more. In particularly preferred embodiments, the material is characterized by being essentially free of residual chemical blowing agent or free of reaction by-products of chemical blowing agent. That is, they include less residual chemical blowing agent or by-product that is inherently found in articles blown with any chemical blowing agent.

A pressure and metering device 58 typically is provided between blowing agent source 56 and that at least one port 54. Device 58 can be used to meter the blowing agent so as to control the amount of the blowing agent in the polymeric stream within the extruder to maintain blowing agent at a level, according to one set of embodiments, between about 1% and 25% by weight, preferably between about 6% and 20% by weight, more preferably between about 8% and 15% by weight, more preferably still between about 10% and 12% by weight, based on the weight of the polymeric stream and blowing agent. The particular blowing agent used (carbon dioxide, nitrogen, etc.) and the amount of blowing agent used is often dependent upon the polymer, the density reduction, cell size and physical properties desired.

The pressure and metering device can be connected to a controller (not shown) that also is connected to drive motor 40 to control metering of blowing agent in relationship to flow of polymeric material to very precisely control the weight percent blowing agent in the fluid polymeric mixture.

Although port 54 can be located at any of a variety of locations along the barrel, according to a preferred embodiment it is located just upstream from a mixing section 60 of the screw and at a blowing agent receiving section 62 of the screw where the screw includes unbroken flights. Mixing section 60 is particularly useful for admixing the blowing agent and polymer to promote the formation of a single-phase solution of polymer and blowing agent within the extruder.

The described arrangement facilitates a method that can be practiced according to several embodiments of the invention, in combination with injection molding or ejection of polymeric material through a die. The method involves introducing, into fluid polymeric material flowing at a rate of from about 0.4 to about 1.4 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.5% by weight based on the weight of the solution in this arrangement. In some embodiments, the rate of flow of the fluid polymeric material is from about 6 to 12 lbs/hr. In these arrangements, the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

Restriction element 35 is located upstream of port 54, and thus upstream of a blowing agent receiving section 62, and typically downstream of a metering section 63 of screw 38. The restriction element is one example of an arrangement in which the extruder is constructed and arranged to maintain a solution of polymer and blowing agent within a polymer processing space between the blowing agent inlet and the extruder outlet (die, entrance into a mold, or other outlet) at a relatively high pressure through an injection or ejection cycle. Those of ordinary skill in the art understand the structural meaning of an extruder that is constructed and arranged to maintain a pressure in this way, and examples are given herein that are not intended to limit the scope of the invention. Restriction element 35 can take any of a variety of forms known in the art for restricting the upstream flow of polymer material, such as a blister, a dam across the feed-section of the screw, a reverse screw flight, or a valve. In preferred embodiments, as illustrated in FIGS. 1-4, the restriction element 35 is a ring check valve.

Figure 2:
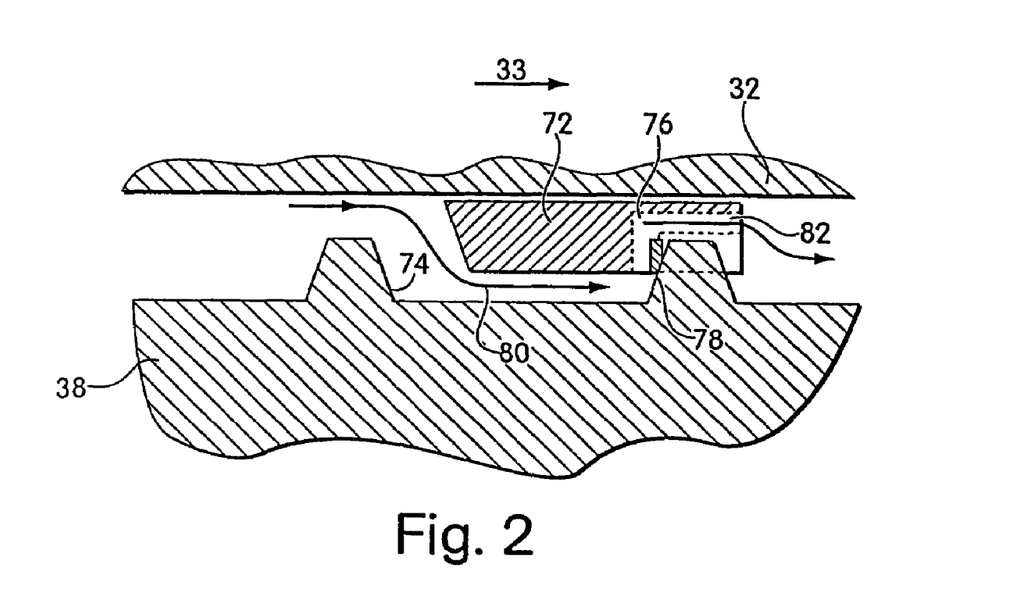
FIG. 2 illustrates a section of a restriction element permitting the flow of polymeric material in a downstream direction in the injection molding system of FIG. 1.
Figure 3:
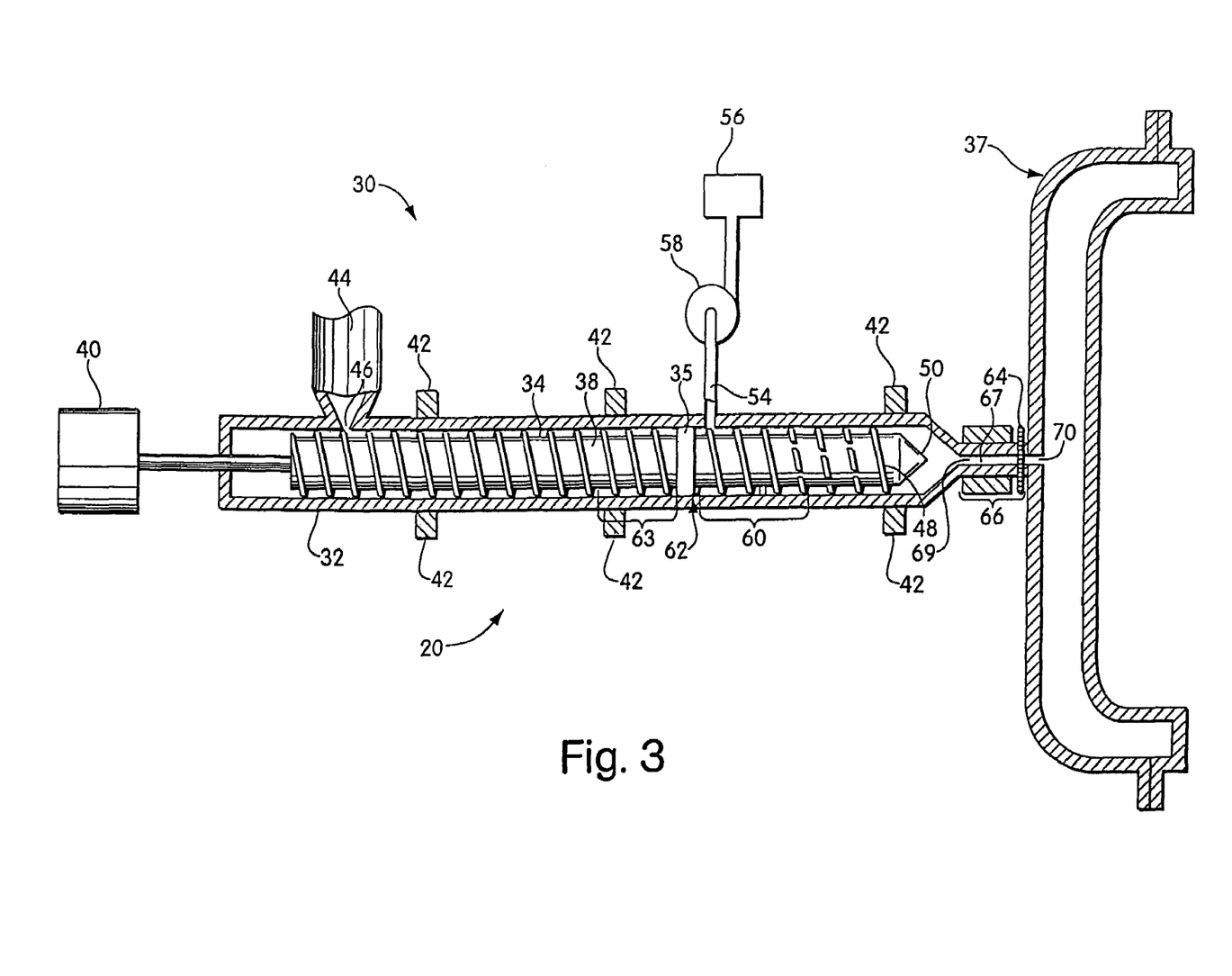
FIG. 3 illustrates an injection molding system including a reciprocating screw in an injection position.
Figure 4:
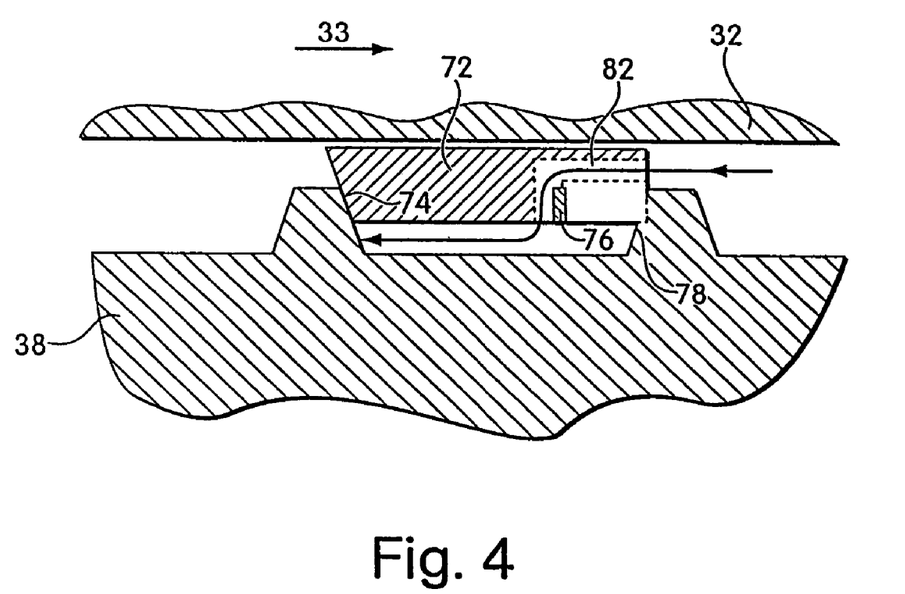
FIG. 4 illustrates a section of a restriction element preventing the flow of polymeric material in an upstream direction in the injection molding system of FIG. 3.

The ring check valve includes a ring that extends around the diameter of a small section of the screw and is laterally moveable between a first position, allowing the flow of material therethrough, and a second position, preventing the flow of material therethrough. The outer diameter of the ring is sized to substantially prevent the flow of plastic between the ring and the barrel, while still allowing the ring to move laterally. In the first position, as illustrated in FIG. 2, an internal ledge 76 of ring 72 contacts a blocking surface 78 that extends from the body of screw 38. Ring 72 is disengaged from a sealing surface 74 of the screw to provide a space therebetween through which polymeric material can flow in a downstream direction following path 80. In this position, polymeric material flows through an internal passageway 82 in the ring to pass downstream of the restriction element. In the second position, as illustrated in FIG. 4, ring 72 is displaced in an upstream direction and is engaged with sealing surface 74 of the screw to provide a restriction to upstream flow of polymeric material. In some preferred embodiments, the engagement between the ring and sealing surface substantially prevents the upstream flow of polymeric material therebetween. In other cases, the ring and sealing surface are constructed to allow a small amount of upstream flow, when engaged (e.g. via channels between the ring and the sealing surface that exist when the ring is in the second position). The sealing surface and the surface of the ring may be tapered, as illustrated, to provide a tight seal particularly when the prevention of upstream flow is desired.

The relative position of the ring depends upon the forces acting upon it. In particular, the ring's position depends upon the difference in the pressure of the polymeric material upstream of the ring and the pressure of the polymeric material downstream of the ring. In preferred embodiments, the ring is designed to be in the first position when the upstream pressure is greater than downstream pressure and to move to the second position when the downstream pressure is greater than the upstream pressure. In typical operation, at the beginning of the injection or ejection cycle the ring is generally disengaged from the sealing surface (FIG. 2), because the pressure of the molten plastic upstream of the ring is greater than the downstream pressure, thus permitting polymeric material to be conveyed in a downstream direction past the restriction element and to accumulate in region 50. When a sufficient charge of polymer and blowing agent solution has been accumulated in region 50, the screw moves in a downstream direction from the accumulation position (FIG. 1) to an injection or ejection position (FIG. 3) to inject the accumulated material through a nucleating pathway 67, as discussed further below, and into mold 37. The downstream motion of the screw compresses the accumulated charge, thereby elevating its pressure. This creates a high pressure condition on the downstream side of the ring relative to the upstream side, which causes the ring to move to the second position to engage the sealing surface (FIG. 4) thereby restricting the flow of polymeric material and maintaining the pressure downstream of the restriction element. Typically, the ring remains in the second position until the pressure upstream of the restriction element exceeds the downstream pressure, at which point the ring returns to the first position.

The restriction element maintains the pressure of the polymer and blowing agent solution downstream of the restriction element above a minimum pressure throughout the cycle. In many cases, the restriction element maintains a pressure downstream of the restriction element throughout the cycle, of at least 1000 psi, in some cases at least 2000 psi, and in some cases at least 3000 psi. In preferred embodiments, the pressure downstream of the restriction element throughout the cycle is maintained greater than the critical pressure required for a single-phase solution of polymeric material and blowing agent for a given set of operating conditions. The critical pressure depends upon the weight percentage of blowing agent dissolved in the polymeric material, and other operating conditions such as temperature. By maintaining the polymeric and blowing agent single-phase solution at a pressure above the critical pressure, the restriction element insures that the blowing agent will not prematurely come out of solution within the extruder, prior to the nucleation step, due to a pressure drop resulting from the upstream flow of polymeric material during injection or ejection. Because systems for processing microcellular foams require the maintenance of a single-phase solution prior to the nucleation step, the restriction element, thus, is particularly advantageous in such systems. Typically, if blowing agent and polymeric material are not a single-phase solution prior to nucleation, microcellular materials cannot be formed.

In some preferred embodiments that utilize a ring check valve, a non-negligible time period exists as the ring moves from the first position to the second position. During this time period, the ring check valve permits limited upstream flow of polymeric material therethrough prior to engaging with the sealing surface, which can be advantageous in lowering the high pressure condition downstream of the restriction element. This limited upstream flow prevents an unsafe, high-pressure condition (e.g. a pressure condition greater than operating pressures of the extruder) which could result if the restriction element eliminated all upstream flow of the polymeric material past the element. The amount of pressure relief depends upon the extent of this time period which is a function of the viscosity of the molten polymer, the ring design, and the injection speed, and can be adjusted appropriately by those of ordinary skill in the art.

In many injection molding embodiments, the single-phase solution of polymeric material and blowing agent is nucleated by injecting the solution through a pressure-drop nucleating pathway 67 fluidly connecting the accumulation region to the mold. Typically, the system includes a valve which controls the flow of material through the nucleating pathway and operates in conjunction with the injection cycle. As used herein, "nucleating pathway" in the context of rapid pressure drop is meant to define a pathway that forms part of microcellular polymer foam extrusion apparatus and in which, under conditions in which the apparatus is designed to operate (typically at pressures of from about 1500 to about 30,000 psi upstream of the nucleator and at flow rates of greater than about 5 lbs polymeric material per hour), the pressure of a single-phase solution of polymeric material admixed with blowing agent in the system drops below the saturation pressure for the particular blowing agent concentration at a rate or rates facilitating nucleation. Nucleating pathway 67 includes an inlet end 69 for receiving a single-phase solution of polymeric material precursor and blowing agent as a fluid polymeric stream, and a nucleated polymer releasing end 70 for delivering nucleated polymeric material to molding chamber, or mold, 37. Nucleator 66 can be located in a variety of locations downstream of region 50 and upstream of mold 37. In a preferred embodiment, nucleator 66 is located in direct fluid communication with mold 37, such that the nucleator defines a nozzle connecting the extruder to the molding chamber and the nucleated polymer releasing end 70 defines an orifice of molding chamber 37. Although not illustrated, another embodiment of nucleator 66 includes a nucleating pathway 67 constructed and arranged to have a variable cross-sectional dimension, that is, a pathway that can be adjusted in cross-section. A variable cross-section nucleating pathway allows the pressure drop rate in a stream of fluid polymeric material passing therethrough to be varied in order to achieve a desired nucleation density.

In one embodiment, a nucleating pathway that changes in cross-sectional dimension along its length is used. In particular, a nucleating pathway that decreases in cross-sectional dimension in a downstream direction can significantly increase pressure drop rate thereby allowing formation of microcellular material of very high cell density using relatively low levels of blowing agent. These and other exemplary and preferred nucleators are described in co-pending International patent application serial no. PCT/US97/15088, entitled "Method and Apparatus for Microcellular Polymer Extrusion" of Anderson, et al., referenced above.

While pathway 67 defines a nucleating pathway, some nucleation also may take place in the mold itself as pressure on the polymeric material drops at a very high rate during filling of the mold. In another embodiment, also described in commonly-owned co-pending international patent application serial no. PCT/US97/27118, nucleation of the single phase solution of polymeric material and blowing agent does not occur across the pathway connecting the outlet of the extruder to the inlet of the mold. In these embodiments, the single phase solution is injected into the mold and maintained as a single phase solution until the mold is cracked, that is opened. This "cracking" process reduces the pressure in the mold thereby nucleating the cell.

The system depicted in FIGS. 1-4 illustrates the operation of the restriction element in conjunction with a reciprocating screw in an injection molding system. It should be understood that this and other systems, described herein, can be modified, as well known in the art, to function as other polymer processing systems that include reciprocating screws. For example, a blow molding system having an accumulation region within the barrel and a reciprocating screw that utilizes the restriction element included, in which cyclical accumulation and ejection from the die takes place. Generally, blow molding systems employ blow molding forming dies that are fluidly connected to the polymer processing space and have an outlet designed to release a parison of polymeric foam precursor material to a blow mold which forms the blow molded foam article. Preferred blow molding systems are described in co-pending U.S. patent application Ser. No. 09/241,352, filed Feb. 2, 1999.

Figure 5:
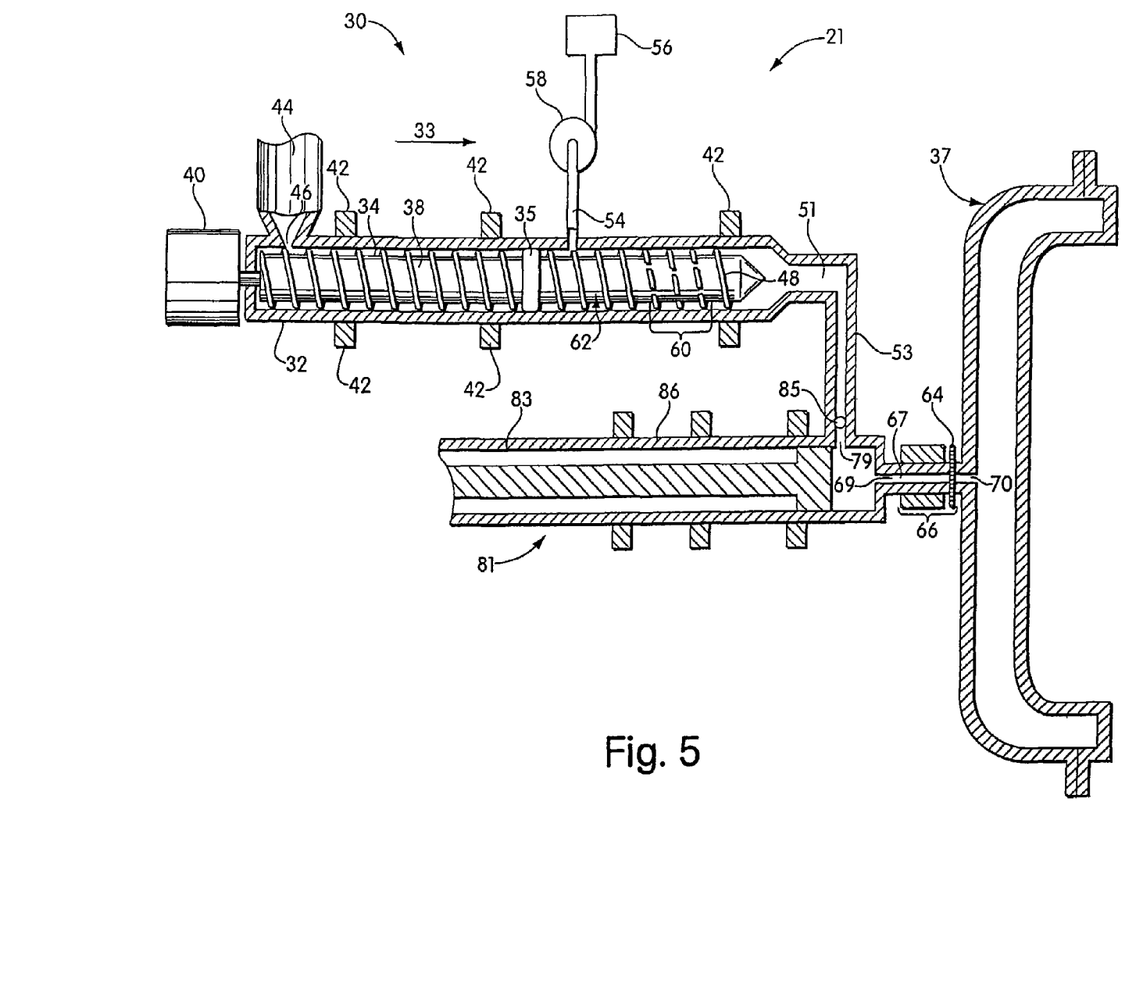
FIG. 5 illustrates an injection molding system including an accumulator in an injection position.

Referring to FIG. 5, in another embodiment of the invention, restriction element 35 is used in a system 21 that includes an accumulator 81 external of the extruder 30. An outlet 51 of the extruder delivers a solution of polymeric material and blowing agent through a conduit 53 to the inlet 79 of the accumulator. A ball check valve 85 is located near the inlet 79 of the accumulator to regulate the flow of material into the accumulator and to prevent back flow of the accumulated material during injection (or ejection, where blow molding is carried out). Accumulator 81 includes a plunger 83 constructed and arranged to axially reciprocate during the injection cycle within a housing 86 by the action of a hydraulically controlled injection cylinder (not shown). The accumulator is fluidly connected to the inlet 69 of nucleating pathway through which the solution is injected into injection mold 37.

Figure 6:
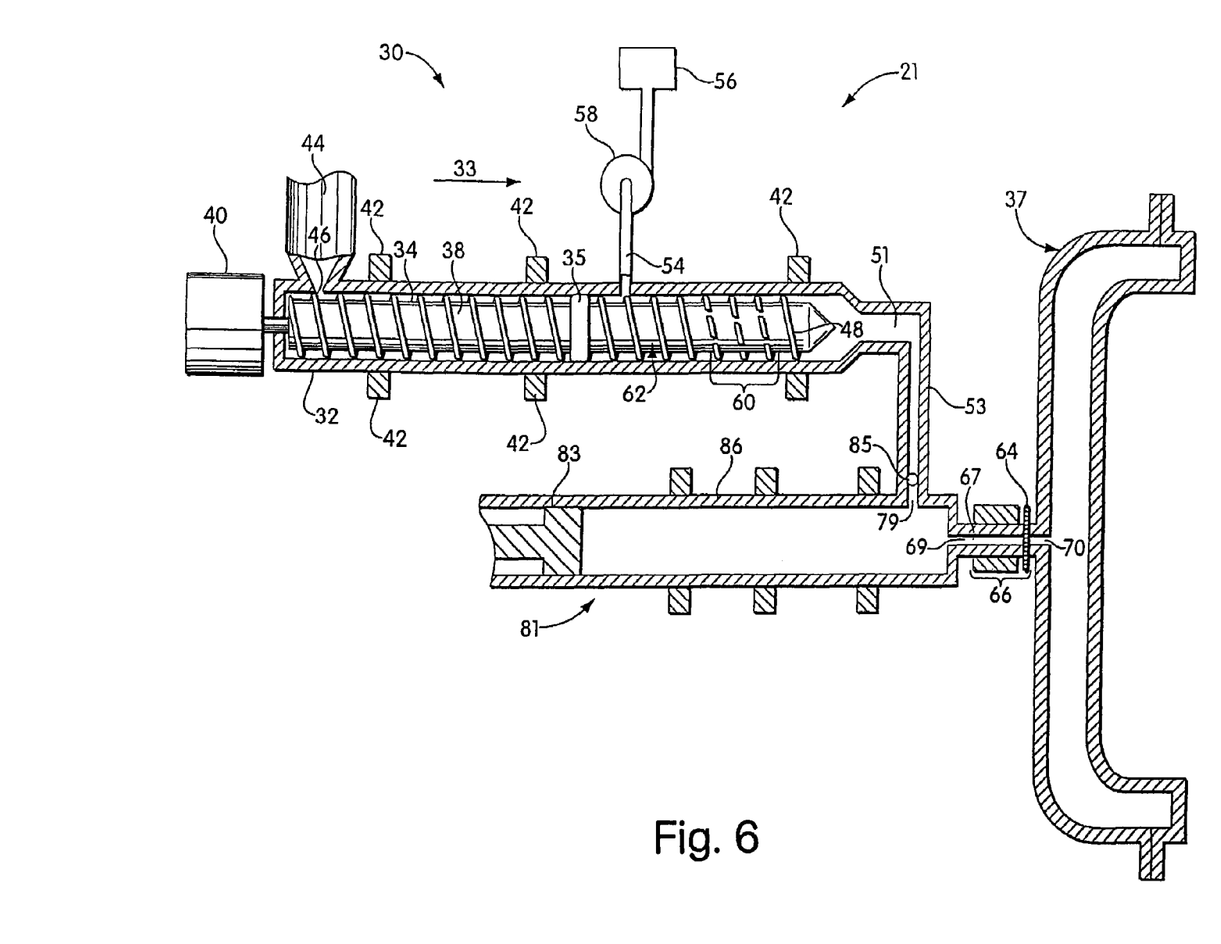
FIG. 6 illustrates an injection molding system including an accumulator in an accumulation position.

In operation, following the injection of polymeric material into a mold the plunger is positioned in an injection position (FIG. 5). Screw 38 rotates to convey polymeric material in a downstream direction and, as described above, a blowing agent is introduced into the polymeric material to form a solution of blowing agent and polymer. The extruder provides the polymer and blowing agent solution, which typically is a single-phase solution, to the accumulator. The accumulating charge forces the plunger in an upstream direction to an accumulation position (FIG. 6). After a sufficient charge has been accumulated, screw 38 stops rotating, that is the screw idles. Plunger 83 then moves in a downstream direction from the accumulation position to the injection position to inject the charge into the mold, thus completing the injection cycle.

During the idle period of the screw, restriction element 35 restricts the backflow of polymeric material and thus maintains the pressure downstream of the restriction element above a minimum value. In typical systems that do not include the restriction element, the pressure in the barrel drops significantly when the screw idles, and in many cases below that required for the maintenance of a single-phase solution of polymeric material and blowing agent. The restriction element 35 can be any of the above-described types. Preferably, in systems having a separate accumulator, the restriction element is a spring-loaded ring check valve as illustrated in FIGS. 7 and 8.

Figure 7:
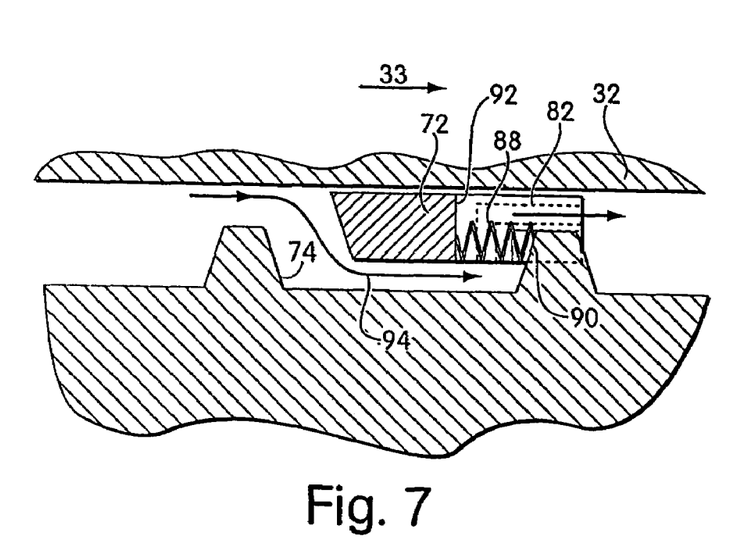
FIG. 7 illustrates a section of a restriction element permitting the flow of polymeric material in a downstream direction in the injection molding system of FIG. 6.
Figure 8:
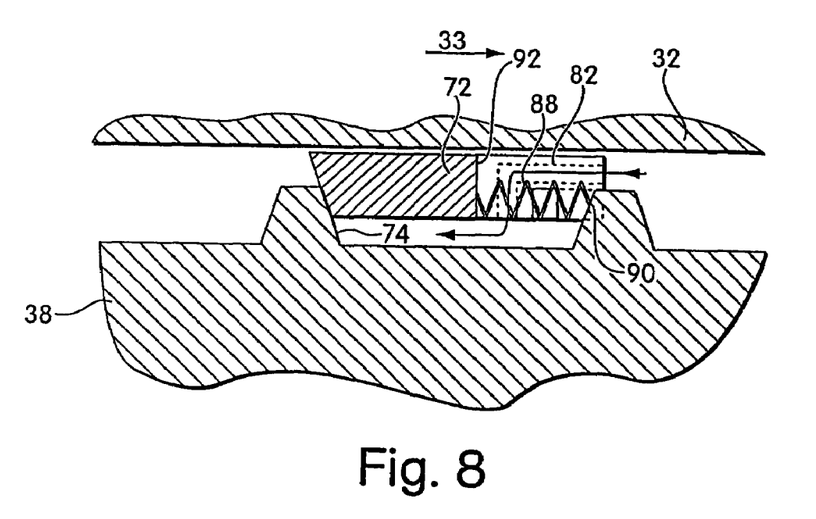
FIG. 8 illustrates a section of a restriction element preventing the flow of polymeric material in an upstream direction in the injection molding system of FIG. 5.

Referring to FIGS. 7 and 8, the spring-loaded check valve includes a spring element 88 disposed between a retaining surface 90 extending from the screw and an internal surface 92 of the ring. The polymeric material when conveyed by the rotating screw, pushes in a downstream direction on ring 72 with sufficient force to compress spring element 88 thereby creating a space between the sealing surface 74 and the ring through which polymeric material flows following path 94 (FIG. 7). As described above, the ring includes an internal passageway 82 to permit the flow of polymeric material to the downstream side of the restriction element. When the screw idles, polymeric material is no longer conveyed in a downstream direction and, thus, does not provide a downstream force on the spring element. The spring element extends to force ring 72 in an upstream direction to engage with the sealing surface 74 (FIG. 8). As described above, the engagement between the ring and the sealing surface restricts upstream flow of polymeric material and thereby maintains the pressure downstream of the restriction element above a minimum value.

The system depicted in FIGS. 5-8 illustrates the operation of the restriction element in conjunction with an external accumulator in an injection molding system. It should be understood that the system can modified, as well known in the art, to function as other polymer processing systems that include an accumulator external of the screw. In particular, blow molding systems are envisioned.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for processing polymeric foam material, comprising:
   a barrel;
   a screw having an upstream end and a downstream end, the screw mounted within the barrel and rotatable to convey a solution of polymeric material and blowing agent in a downstream direction within a polymer processing space defined between the barrel and the screw; and
   a restriction element positioned upstream of the downstream end of the screw that restricts upstream flow of the solution within the polymer processing space during at least a portion of an injection or an ejection cycle,
   wherein the restriction element comprises a valve constructed and arranged to permit downstream flow of the solution therethrough in a first position and to restrict upstream flow of the solution therethrough in a second position.

2. The system of claim 1, wherein the screw comprises a mixing section.

3. The system of claim 2, wherein the restriction element is positioned upstream of the mixing section.

4. The system of claim 1, wherein the screw comprises a blowing agent receiving section.

5. The system of claim 4, wherein, the blowing agent receiving section includes unbroken screw flights.

6. The system of claim 4, wherein the restriction element is positioned upstream of the blowing agent receiving section.

7. The system of claim 1, wherein the screw comprises a metering section.

8. The system of claim 7, wherein the metering section is positioned upstream of the restriction element.

9. The system of claim 1, wherein the screw comprises a mixing section positioned downstream of the restriction element and a metering section positioned upstream of the restriction element.

10. The system of claim 1, wherein the restriction element is positioned upstream of a blowing agent port.

11. The system of claim 10, wherein the blowing agent port is formed in the barrel.

12. The system of claim 1, wherein the restriction element includes a ring that extends around the diameter of the screw.

13. The system of claim 12, wherein the ring is designed to contact a surface that extends from the screw to substantially prevent the upstream flow of the solution therebetween.

14. The system of claim 1, wherein the restriction element comprises a ring check valve.

15. The system of claim 1, wherein the restriction element is constructed and arranged to restrict the upstream flow of the solution therethrough during at least a portion of the injection or the ejection cycle, to maintain the solution downstream of the restriction element at a pressure of at least 1000 psi throughout the injection or the ejection cycle.

16. The system of claim 1, wherein the restriction element is constructed and arranged to restrict the upstream flow of the solution therethrough during at least a portion of the injection or the ejection cycle to maintain the solution downstream of the restriction element at a pressure of at least 2000 psi throughout the injection or the ejection cycle.

17. The system of claim 1, wherein the restriction element is constructed and arranged to restrict the upstream flow of the solution therethrough during at least a portion of the injection or the ejection cycle to maintain the solution downstream of the restriction element at a pressure of at least 3000 psi throughout the injection or the ejection cycle.

18. The system of claim 1, wherein the restriction element is constructed and arranged to restrict the upstream flow of the solution therethrough during at least a portion of the injection or the ejection cycle to maintain the solution downstream of the restriction element at a pressure of at least the critical pressure required for the maintenance of a single-phase solution of polymer and blowing agent throughout the injection or the ejection cycle.

19. The system of claim 1, wherein the screw moves from an accumulation position to an injection position during the injection or the ejection cycle.

20. The system of claim 1, further comprising an accumulator fluidly connected to the polymer processing space and designed to receive and accumulate a charge of the solution, the accumulator including a plunger constructed and arranged to move from an accumulation position to an injection position during the injection or the ejection cycle.

21. The system of claim 1, wherein the restriction element is constructed and arranged to restrict the upstream flow of the solution therethrough when the pressure of the solution downstream of the restriction element exceeds the pressure of the solution upstream of the restriction element.

22. The system of claim 1, wherein the restriction element is constructed and arranged to substantially prevent the upstream flow of the solution during at least a portion of the injection or the ejection cycle.

23. The system of claim 1, wherein the valve is constructed and arranged to move from the first position to the second position when the pressure of the solution downstream of the valve exceeds the pressure of the solution upstream of the valve.

24. The system of claim 1, wherein the valve includes a spring element, the spring element being biased to urge the valve from the first position to the second position.

25. The system of claim 1, wherein the valve is constructed and arranged to substantially prevent upstream flow of solution therethrough in the second position.

26. The system of claim 1, wherein the valve is constructed and arranged to permit limited upstream flow of solution therethrough during a time period when the valve moves from the first position to the second position.

27. The system of claim 1, wherein the screw reciprocates between an accumulation position and an injection position and the valve is in the second position for at least a portion of the time when the screw is in the injection position.

28. The system of claim 1, wherein the valve is in the second position for at least a portion of the time when the screw is idle.

29. The system of claim 1, further comprising an injection mold connected to the polymer processing space.

30. The system of claim 1, further comprising:
 a blow molding forming die fluidly connected to the polymer processing space and having an outlet designed to release a parison of polymeric foam precursor material; and
 a blow mold positionable to receive the parison from the outlet of the die.

31. The system of claim 1, wherein the system is constructed and arranged to form a microcellular material.

32. The system of claim 1, wherein the solution is a single-phase solution.

* * * * *